July 16, 1963
B. F. KELLEY
3,097,552
PIPE TONGS
Filed Sept. 28, 1961
2 Sheets-Sheet 2
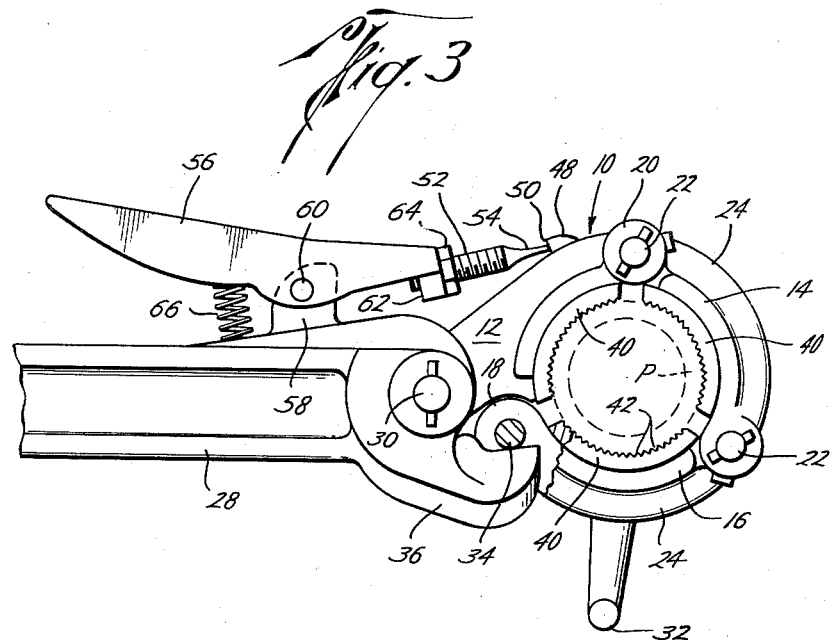
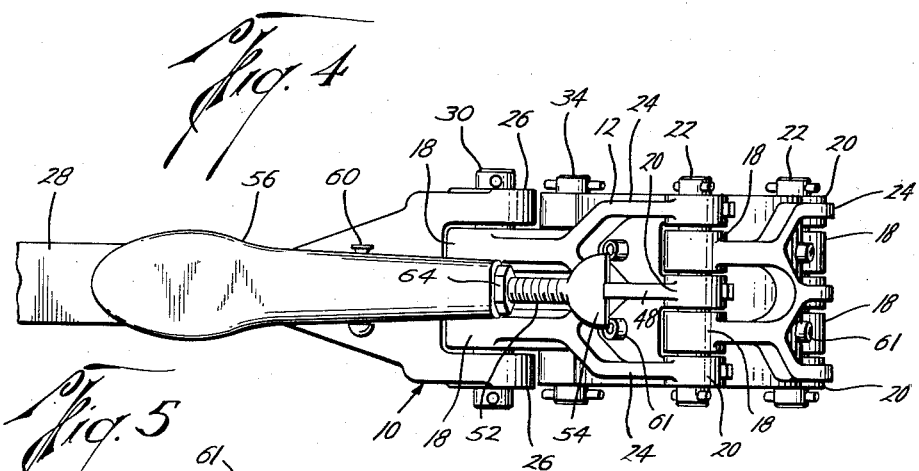
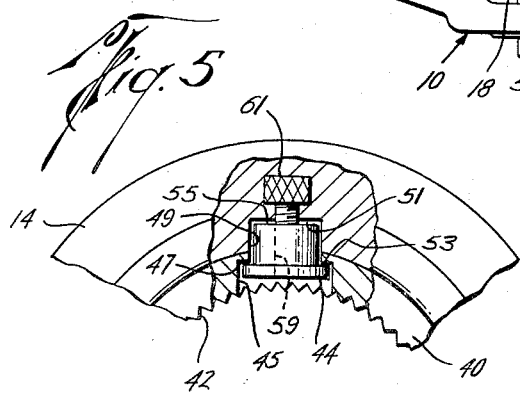
Benjamin F. Kelley
INVENTOR.
BY
ATTORNEY 3,097,552
PIPE TONGS
Benjamin F. Kelley, 18 S. Madison, Tulsa, Okla.
Filed Sept. 28, 1961, Ser. No. 141,521
4 Claims. (Cl. 81—66)

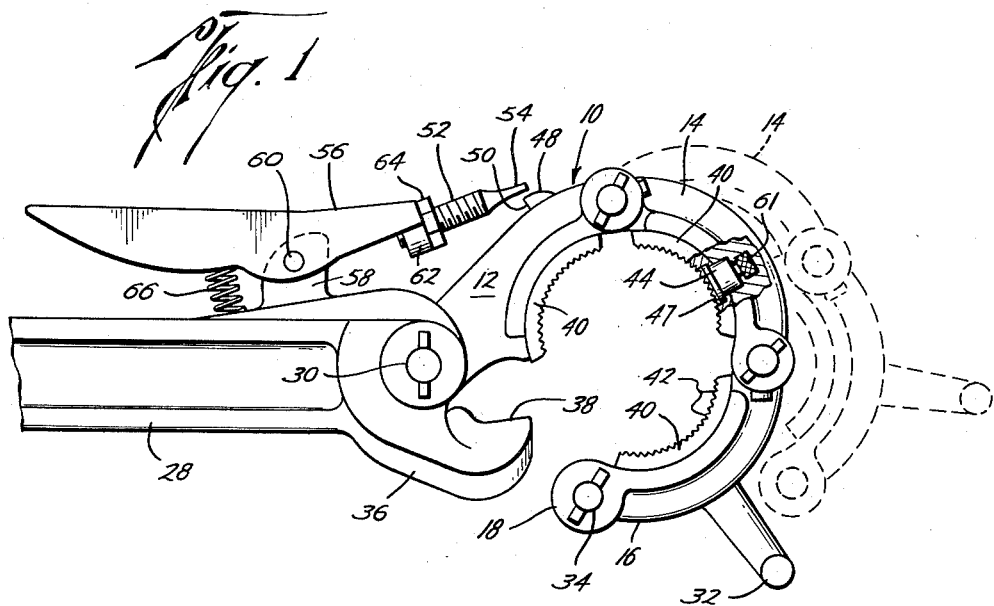
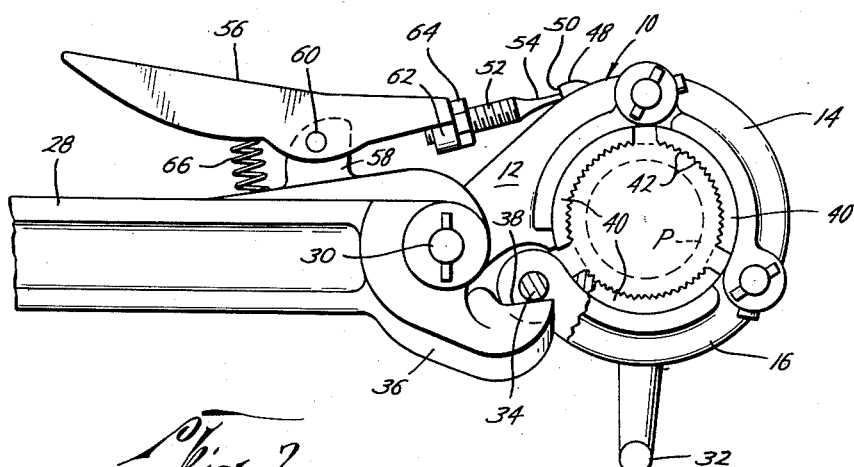

This invention relates to pipe tongs, and more particularly to tongs designed for use in rotating threaded sections of pipe in connecting and disconnecting such sections in the assembling and disassembling of pipe strings.

The invention is capable of wide utility for the holding or rotating of pipes and finds particular application in connection with the assembling and disassembling of pipe strings such as the casing, drilling strings and tubing strings employed in oil wells.

In the drilling and production of oil and gas wells, long strings of pipe are assembled and disassembled in inserting and removing such strings from the well bore, the sections of pipe being connected together or disconnected by holding one section stationary while the other is rotated. The connecting and disconnecting of sections of pipe for this purpose is frequently carried out by the use of manually operated tongs, which are applied to the pipe at a convenient location to be operated by two men standing opposite each other so that one man may grasp the handle of the tong and rotate the pipe through a portion of a turn and then let go of the handle, whereupon the other man may take hold of the handle and rotate the pipe through another portion of a turn. By thus passing the handle from one to the other, the operators may quickly rotate the pipe without substantial interruption until the connecting or disconnecting of a section of pipe is completed.

Pipe tongs used for this purpose are usually constructed to grip the pipe upon the exertion of a pulling force on the handle of the tongs in the direction in which the pipe is to be rotated with the tongs in position on the pipe and during the rotation of the pipe in this manner, there is frequently some relaxing of the rotative force applied when one man releases the handle and the other man takes hold of the same, so that the gripping action of the tongs is momentarily relaxed allowing the tongs to fall.

The present invention has for an important object the provision of pipe tongs of improved construction embodying means for holding the tongs in gripping engagement with the pipe to prevent releasing of the tongs when the rotative force is relaxed during the operation of the tongs.

Another object of the invention is to provide a tong having a generally circular articulated body composed of a plurality of arcuate segments to permit the body to be positioned in surrounding relation to a pipe, and including an operating lever pivotally connected to one end of the body, and means on the lever and the other end of the body positioned for coaction to clamp the body about the pipe and to increase the leverage exerted by the lever during the rotation of the pipe.

A further object of the invention is the provision of a tong of the kind mentioned in which the operating lever pivotally connected to the body is formed with an extention or claw having a planar face and the other end of the body has a cylindrical pin mounted thereon located to extend in parallel relation to the axis of the body when the body is positioned about the pipe, said face being positioned for engagement with the pin to clamp the body about the pipe and to cause the pin to move in contact with the face in a direction to increase the clamping force exerted by the lever on the body upon the exertion of a pull on the lever in the direction in which the pipe is to be rotated.

Other important objects and advantages of the invention will be apparent from the following detailed description constituting a specification of one embodiment of the invention when considered in conjunction with the annexed drawings, wherein—

FIGURE 1 is a plan view of a tong in accordance with the invention, showing the parts thereof in open position;

FIGURE 2 is a view similar to that of FIGURE 1 showing the tong in closed position about a pipe preliminary to the rotation of the pipe by a counterclockwise pull on the operating lever;

FIGURE 3 is a view similar to that of FIGURE 2 showing the tong in closed, pipe gripping condition on the pipe during the exertion of a rotative pull on the operating lever to rotate the pipe;

FIGURE 4 is a side elevational view of the tong, looking downwardly from above the same as illustrated in FIGURE 3, and FIGURE 5 is a fragmentary detail view on a greatly enlarged scale showing a portion of a segment of the body of the tong with the gripping die thereon and the holding means by which the die is secured to the segment.

Referring now to the drawings in greater detail the tong of the invention comprises a generally circular articulated body generally designated by the numeral 10, which is made up of a number of arcuate segments hingedly connected together to enable the same to be positioned in encircling arrangement about a pipe P. In the present illustration, the body 10 is composed of three segments 12, 14 and 16 of approximately equal arculate length. Each of the segments is provided at one end with a pair of spaced apart, perforate, terminal ears 18, 18, as seen in FIGURE 4, which are spaced inwardly from the upper and lower edges of the segments, and at the other end with three perforate ears 20, 20, 20, suitably spaced apart to receive between them the ears 18, 18 of an adjacent segment to provide an interspersed arrangement adapted to form hinged connections between the segments by the insertion of a hinge pin 22 through the registering perforations of each series of interspersed ears. The segments may be formed with reinforcing flanges 24 extending longitudinally generally circumferentially along the exteriors of the segments and connected at their opposite ends to the ears.

The ears 18, 18 of the segment 12 are off-set radially outwardly somewhat from the end of the segment in position for insertion between suitably spaced perforate ears 26, 26 of an elongated operating lever or member 28, and a hinge pin 30 is inserted through the ears 18, 18 and 26, 26 to hingedly connect the segment to the lever.

The segment 16, which serves as a clamping or holding segment, is provided with an outwardly extending handle 32 positioned to be grasped by an operator and by which the segments may be swung into and out of a position encircling the pipe P. A cylindrical pivot pin 34, which serves as an actuating pin in clamping the segments in closed position about the pipe, is extended through the ears 18, 18 at the outer end of the segment 16. The portion of the pin 34 located between the ears 18, 18 of the segment 16 provides one engaging surface of the clamping mechanism of the tong.

The lever 28 has a claw-like extension or lug 36 extending longitudinally beyond the pivot pin 30 and offset laterally from the longitudinal axis of the lever, and whose outer end portion is provided with an inwardly directed planar face 38, positioned for engagement with the pin 34 between the lugs 18 of the segment 16 when the body is positioned in closed condition about the pipe.

The face 38 and pin 34 are positioned parallel to the axis of the body when the body is closed and the face 38 may be inclined slightly relative to the longitudinal axis of the lever 28, so that upon counterclockwise movement of the lever with the segments closed about the pipe and the face in engagement with the pin, relative movement may take place between the face and pin in a direction to increase the clamping force exerted on the segments by the operating lever. Thus, the segments may be closed about the pipe and the pin 34 engaged with the face 38 close to the outer extremity of the face, as illustrated in FIGURE 2, and when the lever is then pulled in a counterclockwise direction, relative movement will be imparted to the face and pin to position the pin 34 closer to the pivot pin 30, to cause an increase in the clamping force exerted on the segments by such counterclockwise pull on the lever.

Each of the segments 12, 14 and 16 carries a pipe gripping die 40 mounted on its inner surface, which is shaped for engagement with the external surface of the pipe P to grip the pipe when the body is closed. The inner faces of the dies are toothed or wickered, as shown at 42 to grippingly engage the pipe upon closing of the segments about the pipe. The dies are provided with radially outwardly extending bushings 44 seated in openings 45 therethrough, which are formed with internal shoulders 47, these bushings also extending through suitable radially disposed openings 49 in the segments, positioned in registration with the openings 45, and formed with internal shoulders 51, as shown in FIGURE 5. The internal shoulders of the segments and dies face radially inwardly of the body, and the external shoulder 53 of the bushing 44 is disposed in engagement with the internal shoulder 47, while the outer end 55 of the bushing is in engagement with the internal shoulder 51. The bushings 44 are formed with internally threaded bores 59 into which set screws or studs 61 are threadably extended through the segments to securely hold the dies on the segments. The bushings 44 extend partly through the dies and partly through the segments and are formed with external portions 53 and 55 positioned for engagement with the internal shoulders of the openings in the dies and segments, so that the load of the dies is borne by the bushings while the screws 61 serve to hold the bushings in place without bearing the stresses to which the dies may be subjected.

The invention includes latching mechanism for holding the segments against opening movement when the lever is released by the operator during rotational operation of the tong, to prevent the tong from becoming released and falling when the lever is being passed from one operator to another. The latching mechanism comprises an external, shouldered lug 48 on the segment 12, having an outwardly extending, substantially radial face 50 located to be engaged by the outer end of a releasable latch pin 52 mounted on a lever 56 which is pivotally carried on the lever 28 to hold the segment 12 against backward swinging movement away from its pipe gripping position.

The latch pin has a laterally widened outer end portion 54, best seen in FIGURE 4, which is engageable with the face 50 when the mechanism is in latching position and is externally threaded for adjustable connection to the forward end of the latch lever 56 pivotally mounted intermediate its ends on an external, perforate lug 58 on the operating lever 28, as by means of a pin 60. The lever 56 has a thickened end portion 62 in which the pin 52 is threaded, and the pin is provided with a lock nut 64 for holding the pin in adjusted position relative to the lever 56. By this construction, the pin 52 may be rotated to suitably adjust the distance to which it extends beyond the forward end of the lever 56 and the lock nut tightened to hold the pin in adjusted position for engagement with the lug 48 to hold the segment 12 against movement away from its gripping position relative to the pipe P.

A coil spring 66 is positioned between the rearwardly extending arm of the latch lever 56 and the operating lever 28 to yieldingly urge the latching lever toward latching position.

In operating the tong of the invention, the latching lever 56 may be depressed to release the pin 52 from the lug 48, as seen in FIGURE 1, to allow the segments to be fully opened, whereupon the segments may be positioned in encircling relation to the pipe P, the tong being held by the operating lever 28 and handle 32 to close the segments about the pipe and to move the claw 36 and segment 16 to position the face 38 in engagement with the cylindrical pin 34. With the tong thus applied to the pipe, the operating lever 28 may then be pulled in a counter clockwise direction about the pivot pin 30 to tighten the dies 40 into gripping contact with the pipe and to rotate the pipe. Upon such tightening movement of the lever 28, it will be apparent that relative movement will be imparted to the pin 34 and planar face 38 in a direction to increase the closing force exerted by the operating lever on the segments, so that the gripping contact of the dies on the pipe will be increased as the rotational force applied to the pipe is increased.

When the segments have been moved to closed position and tightened about the pipe, the latching lever will be moved toward latching position by the spring 66 to move the latch pin into engagement with the lug 48 to hold the body against opening movement to prevent relaxation of the grip on the pipe when the operating lever is passed from one operator to another in rotating the pipe.

To adjust the latching mechanism to effectively hold the tong against relaxation, the tong may first be applied to the pipe and tightened thereon and the pin 52 then adjusted to be in tight engagement with the lug 48 with the tong in this condition. With the latch mechanism thus adjusted the latching of the tong in gripping engagement with the pipe will then take place automatically when the tong is applied to the pipe. In releasing the tong from the pipe, the latch pin 52 is first released from the lug 48 by depressing the latch lever 56 against the spring 66, after which the operating lever 28 is rotated clockwise to release the pin 34 from the claw 36 to permit the segments to be moved to open position.

It will thus be seen that the invention constructed and used as described above provides a pipe tong which is automatically latched in gripping relation to the pipe when applied thereto, and in which the gripping force of the tong on the pipe is increased as the rotational force applied thereto increases.

The invention is disclosed herein in connection with a certain specific embodiment of the same, but it is to be understood that this is intended by way of example only, and that the invention is capable of numerous modifications within the spirit of the invention and the scope of the appended claims.

Having thus clearly shown and described the invention, what is claimed as new and desired to secure by Letters Patent is:

1. In a pipe tong the combination with an articulated body formed of a plurality of hingedly connected segments adapted to be positioned in encircling relation to a pipe, arcuate gripping dies lining the inner faces of the segments in position for gripping engagement with the pipe, a lever member pivotally connected to one end of the body and means on the member and the other end of the body positioned for coaction when the segments are in pipe encircling position to move the dies into gripping contact with the pipe upon rotating movement of the member about its pivot, of means for securing the dies to the segments comprising registering, radially extending openings in the dies and segments, a radially inwardly facing shoulder in each die and each segment opening, a bushing disposed in and extending partially through both registering openings in each die and segment and formed with radially outwardly facing shoulders in engagement with said radially inwardly facing shoulders in the openings, and threadable means on the bushings and segments positioned for coaction to hold the bushings in the openings.

2. A pipe tong comprising an articulated body formed of a plurality of hingedly connected segments adapted to be positioned in encircling relation to a pipe, arcuate pipe gripping dies lining the inner faces of the segments in position for gripping engagement with the pipe, a lever member pivotally connected to one end of the body, means on the member and the other end of the body positioned for coaction when the segments are in pipe encircling position to move the dies into gripping contact with the pipe upon rotating movement of the member about its pivot, each of said dies having a radial opening therethrough formed with an internal radially inwardly facing shoulder and each of said segments having a radial opening therethrough positioned for registration with the opening of the die and formed with an internal radially inwardly facing shoulder, a bushing disposed in said registering openings and formed with external radially outwardly facing shoulders in engagement with said internal shoulders and threadable means on the bushings and segments positioned for coaction to hold the bushings in the openings.

3. A pipe tong comprising an articulated body formed of a plurality of hingedly connected segments adapted to be positioned in encircling relation to a pipe, arcuate gripping dies lining the inner faces of the segments in position for gripping engagement with the pipe, registering radially extending openings in the dies and segments, a radially inwardly facing shoulder in each die and each segment opening, a bushing disposed in and extending partially through both registering openings in each die and segment and formed with radially outwardly facing shoulders in engagement with said radially inwardly facing shoulders in said openings, threadable means on the bushings and segments positioned for co-action to hold the bushings in the openings, a lever member pivotally connected to one end of the body and provided with an extension projecting laterally outwardly and forwardly from the pivotal end of said member, a cylindrical pin mounted on the opposite end of the body in position for engagement with said extension at one location on the extension when the member is in one position of rotation about its pivot with the segments in pipe encircling position to grippingly engage the dies with the pipe and at another location on the extension when the member is further rotated about its pivot to another position to increase the gripping force exerted by the dies on the pipe, an external, radially extending shoulder formed on the body adjacent said one end, an elongated latch element pivotally mounted intermediate its ends on and extending longitudinally of said lever member, an extension member threadably connected to and extending toward said shoulder from one end of said latch element for longitudinal adjustment thereon to position said member for pivotal movement by said latch element to one position for endwise abutment with said shoulder to hold the dies in gripping engagement with the pipe and to another position out of contact with the shoulder.

4. A pipe tong comprising an articulated body formed of a plurality of hingedly connected segments adapted to be positioned in encircling relation to a pipe, arcuate gripping dies lining the inner faces of the segments in position for gripping engagement with the pipe, registering radially extending openings in the dies and segments, a radially inwardly facing shoulder in each die and each segment opening, a bushing disposed in and extending partially through both registering openings in each die and segment and formed with radially outwardly facing shoulders in engagement with said radially inwardly facing shoulders in said openings, threadable means on the bushings and segments positioned for co-action to hold the bushings in the openings, a lever member pivotally connected to one end of the body and provided with an extension projecting laterally outwardly and forwardly from the pivotal end of said member, a cylindrical pin mounted on the opposite end of the body in position for engagement with said extension at one location on the extension when the member is in one position of rotation about its pivot with the segments in pipe encircling position to grippingly engage the dies with the pipe and at another location on the extension when the member is further rotated about its pivot to another position to increase the gripping force exerted by the dies on the pipe, an external, radially extending shoulder formed on the body adjacent said one end, an elongated latch element pivotally mounted intermediate its ends on and extending longitudinally of said lever member, an extension member having a laterally extended end portion threadably connected to and extending toward said shoulder from one end of said latch element for longitudinal adjustment thereon to position said end portion of said extension member for pivotal movement by said latch element into and out of a latching position in endwise abutment with said shoulder to hold the dies in gripping engagement with the pipe, and yieldable means positioned for coaction with said latch element and lever member to yieldingly urge the latch element toward latching position.

References Cited in the file of this patent
UNITED STATES PATENTS

| | | |
|---|---|---|
| 379,123 | Parmelee | Mar. 6, 1888 |
| 773,933 | Fisher | Nov. 1, 1904 |
| 789,717 | Combs | May 16, 1905 |
| 1,088,819 | Griffin | Mar. 3, 1914 |
| 1,532,469 | Black | Apr. 7, 1925 |
| 1,547,543 | Welty | July 28, 1925 |
| 1,900,370 | Smith | Mar. 7, 1933 |